United States Patent

[11] 3,603,405

[72] Inventors Loren Glenn Arnold
Rock Island;
Richard Dale Nelson, Cambridge, both of, Ill.
[21] Appl. No. 1,217
[22] Filed Jan. 7, 1970
[45] Patented Sept. 7, 1971
[73] Assignee Deere & Company
Moline, Ill.
Continuation-in-part of application Ser. No. 733,115, May 29, 1968, now abandoned.

[54] DEVICE FOR AUTOMATICALLY LANDING A SEMI-INTEGRAL MOLDBOARD PLOW
13 Claims, 8 Drawing Figs.
[52] U.S. Cl................................................. 172/26,
172/285, 172/324, 172/667, 172/677, 280/468
[51] Int. Cl....................................................A01b 69/00,
A01b 65/02
[50] Field of Search........................................... 172/26,
324, 741, 98, 677, 679, 667, 5, 9, 673, 285, 286,
282, 605; 18/468

[56] References Cited
UNITED STATES PATENTS
1,113,494  10/1914  Schlicht......................  172/26
2,438,625  3/1948   Standlund....................  172/324
2,727,756  12/1955  Van Carlile..................  280/468
2,853,315  9/1958   Hyman.........................  280/468
2,964,113  12/1960  Presnell et al..............  172/9
3,061,020  10/1962  Mannheim.....................  172/285
3,369,612  2/1968   Laikam.......................  172/5
3,398,975  8/1968   Roberts......................  280/468

Primary Examiner—Robert E. Pulfrey
Assistant Examiner—Stephen C. Pellegrino
Attorneys—H. Vincent Harsha, Harold M. Knoth, William A. Murray and John M. Nolan ABSTRACT: An automatic landing device for semi-integral moldboard plows of the type having adjustable hitches with at least a portion of the hitch being interconnected with the frame of the plow by an extensible and retractable hydraulic cylinder for landing. Mounted on the plow frame is a furrow finder having a furrow wall contacting member. The furrow wall contacting member is interconnected with a three-position valve by means of a push rod, the valve controlling flow of fluid from a tractor hydraulic system to the cylinder. The plow frame is shifted relative to the tractor in response to movement of the member so that a fixed distance is maintained between the foremost plow bottom on the plow frame and the adjacent furrow wall.

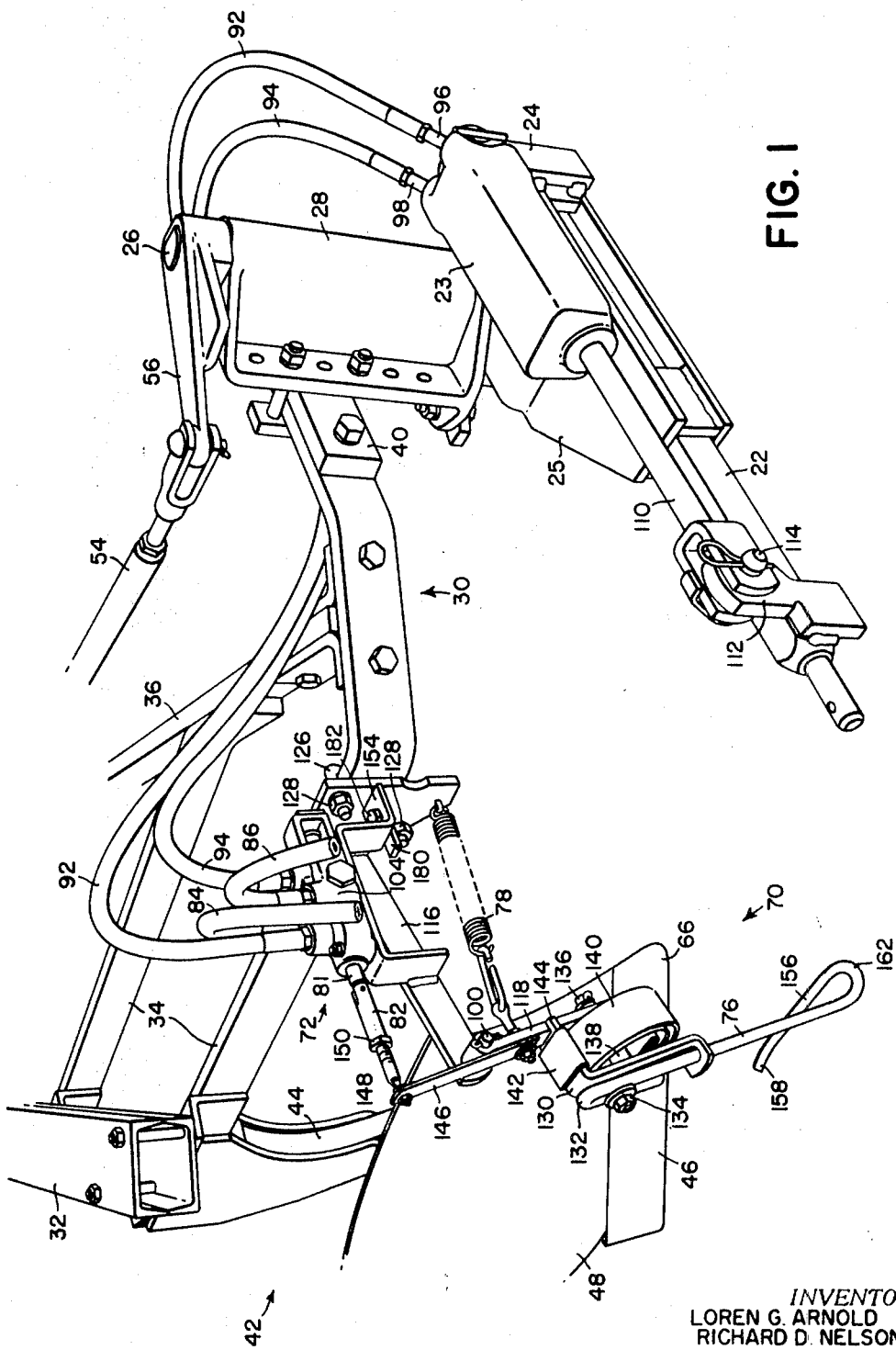

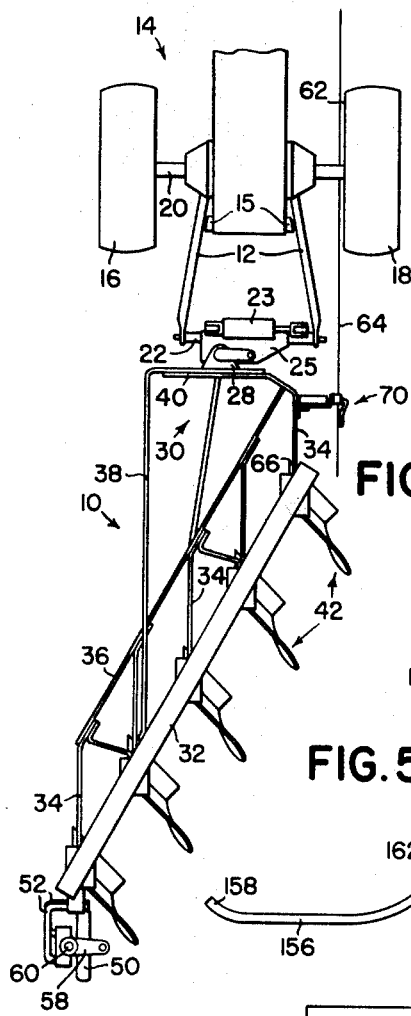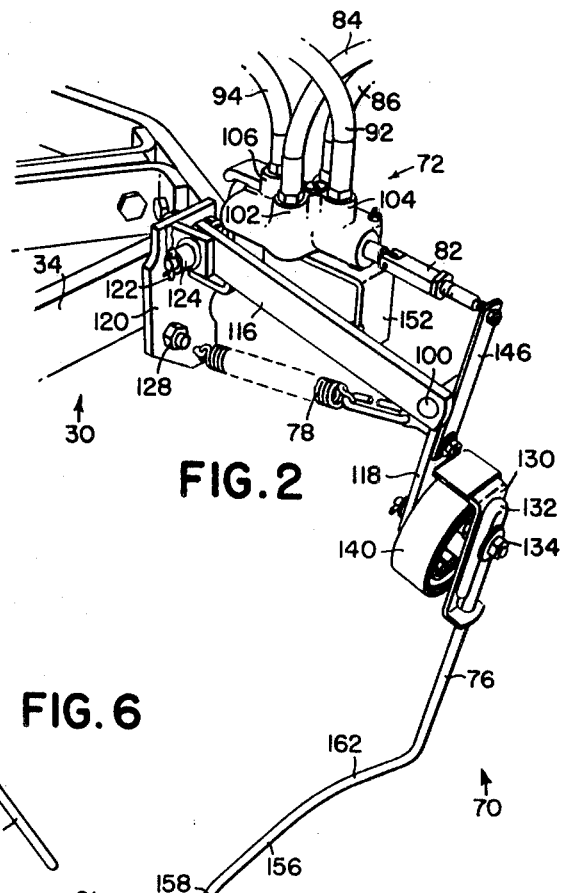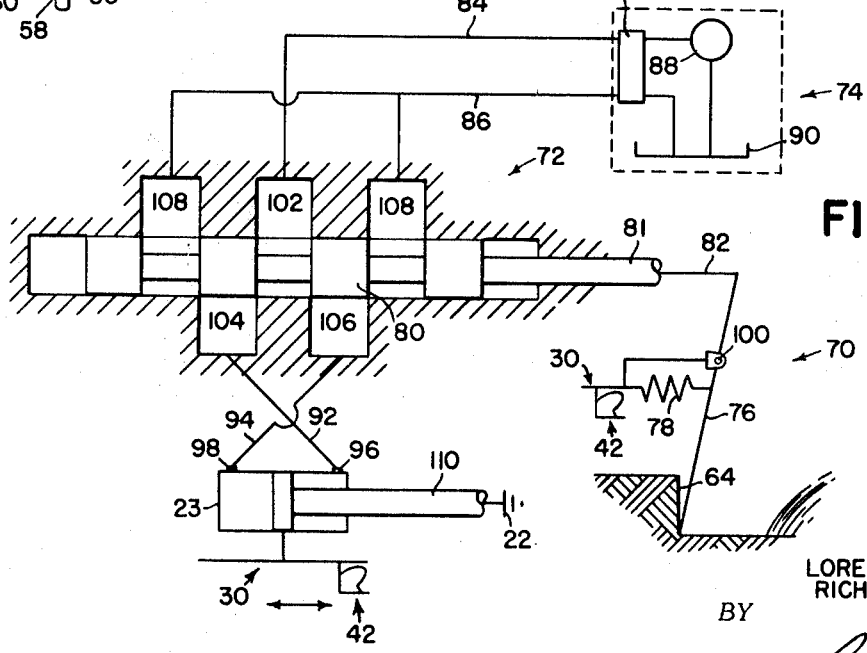

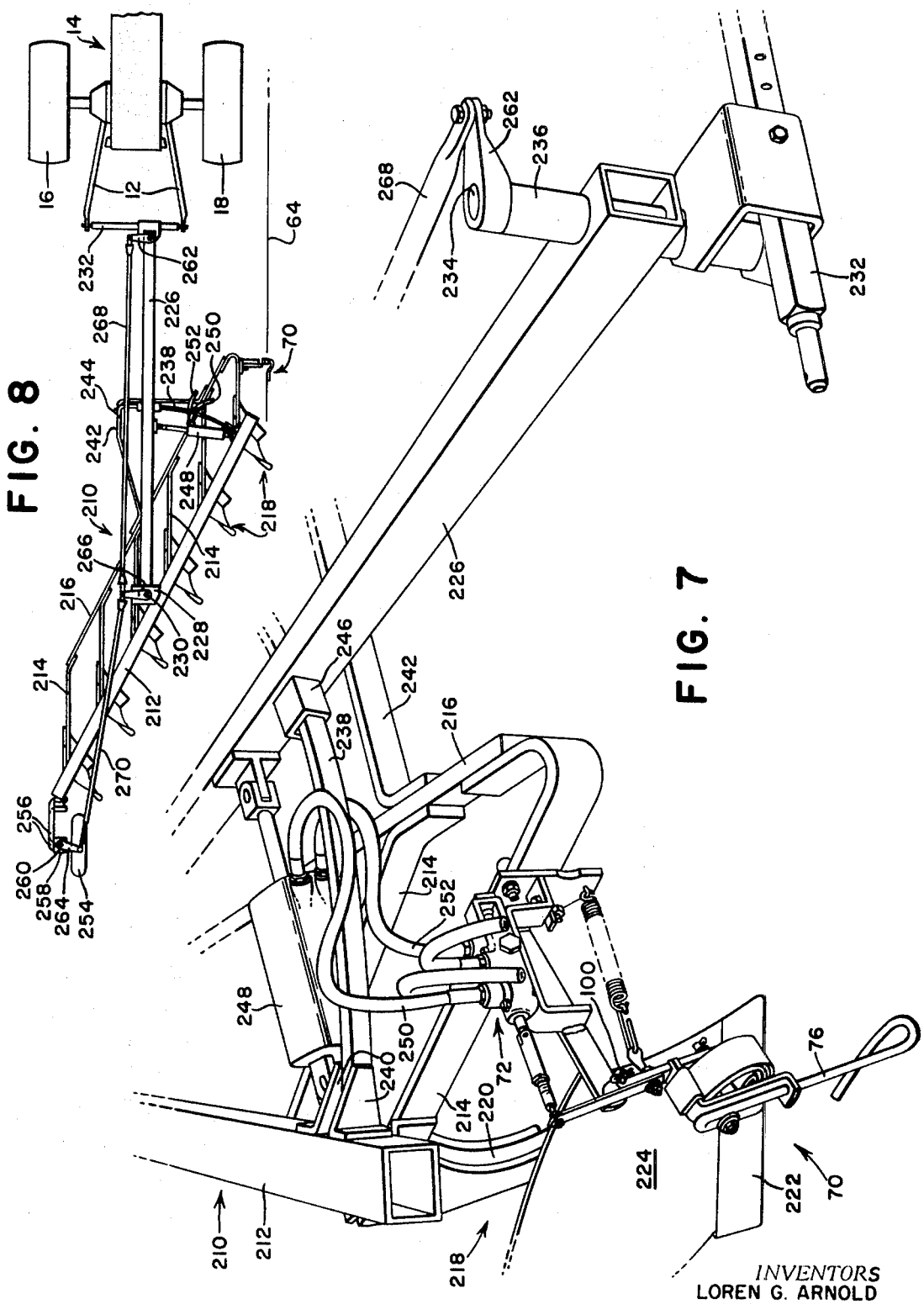

3,603,405

DEVICE FOR AUTOMATICALLY LANDING A SEMI-INTEGRAL MOLDBOARD PLOW

CROSS REFERENCE TO RELATED APPLICATIONS

This application is a Continuation-In-part of applicants' prior application, Ser. No. 733,115 filed 29 May 1968 and now abandoned.

FIELD OF THE INVENTION

The present invention relates generally to agricultural implements, and more particularly to automatic landing devices for semi-integral plows and the like.

DESCRIPTION OF THE PRIOR ART

When plowing it is customary to make successive trips through a field, each trip being made closely adjacent the land plowed during the preceding trip and in the same direction as the preceding trip. In this manner, the furrow made during the preceding trip is filled by the earth displaced by the foremost plow bottom or body on the plow frame during the succeeding trip. To insure that the previous furrow is properly filled, it is necessary to dispose the foremost plow bottom with the point of the plow bottom spaced from the furrow wall a distance equal to the cut of the plow bottom. Thus, if a 16 inch cut plow bottom is being used, the point of the foremost plow bottom will be disposed 16 inches away from the adjacent furrow wall.

It is generally common practice to locate foremost plow body relative to the furrow left from the previous trip through the field by driving the tractor with the wheel adjacent the plowed land disposed within the furrow. The wheel is adjusted so that it is disposed to the outside of the foremost plow bottom with the inner side of the wheel ahead of the outermost portion of the share. In addition to adjusting the wheel, or in the alternative to adjusting the wheel, the plow may be landed relative to the tractor. By landed, it is meant that the plow is shifted laterally relative to the tractor.

When plowing on hillsides, it is difficult to maintain the plow in the desired position since the plow will tend to slip downhill. To give some measure of control, landing devices have been designed so that the operator of the tractor may adjust the plow laterally relative to the tractor, the desired position of the plow relative to the tractor depending upon the particular slope of the hill. The landing devices may be manually operated, or, preferably, hydraulically operated.

Also, as soil conditions vary, the width of cut of the foremost plow bottom may vary. This is due to the fact that the ability of the soil forming the furrow wall to withstand the pressure exerted thereon by the landside of the plow bottom varies with the varying soil condition. For example, a mucky soil exerts a large force on the face of a plow bottom, but has a relatively small capacity to withstand the side thrust exerted on the furrow wall by the landside of the plow bottom while a dry soil exerts a substantially equal force on the face of the bottom, but has a greater ability to withstand the pressure exerted on the furrow wall by the landside. Thus, as the plow is moved from dry soil conditions to mucky soil conditions, the plow will tend to be forced landward, compressing the soil forming the furrow wall, and increasing the distance which the point of the foremost plow bottom is spaced from the previous furrow wall. By landing the plow, it is possible to compensate for the changing soil conditions.

In some tractors today, difficulty is encountered even on level ground due to the use of wide or dual wheels. Many tractors today are equipped with very wide drive wheels, wheels so large in diameter that they do not fit within the previous furrow. While some degree of control can be achieved by placing the wheel partially within the furrow, it is still necessary for the operator of the tractor to exercise careful control of the tractor to insure that the foremost plow body is at the proper distance from the previous furrow. Difficulty is encountered, however, due to the fact that the large tire size will frequently break down the furrow wall and thus it is difficult for the operator to judge where the foremost plow body should be. Another problem exists where the tractor is equipped with dual drive wheels. It is extremely difficult to obtain the desired tractor guidance by placing one of the dual wheels in the previous furrow.

Plows have been designed for use with tractors having tires of great width or having dual tires, these plows having a hitch point so located that the tractor may be driven with all wheels on the land. When plowing with these plows, which are referred to in the trade as tractor-on-the-land plows, the operator of the tractor must guide the tractor in such a manner that the foremost plow body is disposed the desired distance from the previous furrow without any exterior guidance means. It should be obvious that it would be quite difficult to guide the tractor with the precision desired.

SUMMARY OF THE INVENTION

It is an object of the present invention to provide means to automatically land a plow in response to its position relative to an adjacent furrow wall.

More particularly, it is an object of the present invention to provide an automatic furrow finder which can be mounted on a plow, the automatic furrow finder being associated with valve means to direct fluid to a hydraulic landing device whereby the plow may be landed automatically in response to its position relative to an adjacent furrow wall.

Another object of the present invention is to provide an automatic furrow finder which can be mounted on a plow, the automatic furrow finder including a first arm pivotally secured to the plow for swinging movement about a longitudinally extending axis, a second arm secured to the first arm for movement about a fore-and-aft axis, a furrow finder member mounted on the second arm for swinging movement about a transverse axis, means to bias the second arm towards the plow, a three-position valve mounted on the first arm and operable to direct hydraulic fluid under pressure to either end of an extensible and retractable landing cylinder, and linkage means interconnecting the second arm with the valve to cause fluid to be directed to one end or the other of the cylinder in response to the position of the furrow finder relative to the frame of the plow.

These and other objects and advantages of this invention will be apparent to those skilled in the art after a consideration of the following detailed description, taken in conjunction with the accompanying drawings in which the preferred form of this invention is illustrated.

BRIEF DESCRIPTION OF THE DRAWINGS

FIG. 1 is a perspective view taken from the front side of a plow equipped with a hydraulic landing attachment and the automatic furrow finder attachment of this invention which is mounted on the forward end of the plow, the automatic furrow finder being interconnected with valve means which directs fluid towards and from the hydraulic landing attachment.

FIG. 2 is a perspective view of the automatic furrow finder shown in FIG. 1, this view being taken from the rear side.

FIG. 3 is a plan view of the semi-integral plow shown in FIG. 1, the plow being secured to the lower draft links of a tractor.

FIG. 4 is a schematic view illustrating the principles of this invention.

FIG. 5 is a side view of the furrow finder member.

FIG. 6 is a front view of the furrow finder member.

FIG. 7 is a view similar to FIG. 1, but illustrating the furrow finder attachment of the invention on a different form of semi-integral plow.

FIG. 8 is a plan view of the semi-integral plow illustrated in FIG. 7.

DESCRIPTION OF THE PREFERRED EMBODIMENT

In the following description right-hand and left-hand reference is determined by standing to the rear of the plow and facing the direction of travel.

Referring first to FIG. 3, a plow, indicated generally at 10, is shown secured to the lower draft links 12 of a tractor indicated generally at 14, the draft links being held from swaying by blocks 15. The tractor has left and right rear drive wheels 16, 18 adjustably mounted on an axle 20. The plow 10 has a hitch crossbar 22 which is secured to the rear ends of lower draft links 12 during plowing and has a transversely shiftable crossbar assembly 25 carried thereon. The hitch crossbar 22 is connected to the rod end of a double-acting hydraulic cylinder 23, the anchor end being secured to an upstanding lug 24 mounted on the hitch crossbar assembly 25 which is in turn mounted on the lower end of a pivot shaft 26 (FIG. 1) which extends through a pivot bearing 28 rigidly mounted on the forward end of a plow frame, indicated generally at 30.

The plow frame 30 includes an obliquely extending truss box 32, forwardly extending frame bars 34 having their rear ends rigidly secured to the truss box and their forward ends to an obliquely extending truss bar 36, a frame arm 38 and a tie bar assembly 40 which extends between the frame arm 38 and the forward frame bar 34. A plurality of plow bottoms, indicated generally at 42, are mounted on the truss box 32. Each plow bottom or body includes a standard assembly 44 (FIG. 1) having mounted thereon, a share 46 and a moldboard 48. The rear end of the plow is supported by a vertically movable tail wheel 50, the tail being carried by upper and lower parallel links 52. Steering link means 54 (FIG. 1) extend between a forward steering arm 56 mounted on the upper end of the pivot shaft 26 and a rear steering arm 58 mounted on the upper end of a pivot shaft 60, the lower end of the pivot shaft 60 carrying the wheel 50.

Normally, the prior art plow described above is operated with the right wheel 18 disposed in the furrow left by the previous trip through the field with the inner wall 62 of the wheel disposed in rubbing or sliding contact with the furrow wall 64. In this position, the point 66 of the share of the foremost plow bottom should be disposed away from the furrow wall 64 a distance equal to the cut of the plow bottom. The plow 10 may be landed relative to the tractor by means of the hydraulic cylinder 23. Thus, by extending the cylinder 23, the plow frame 30 is shifted to the left relative to the tractor. Similarly, by retracting the cylinder 23, the plow frame shifted to the right relative to the hitch crossbar 22 and the tractor 14.

It is the principal feature of this invention is to provide an automatic furrow finder, indicated generally at 70, which is interconnected with a three-position valve, indicated generally at 72, to interconnect a tractor hydraulic system, indicated generally at 74, with the extendable and retractable cylinder 23 to automatically land the plow 10 in response to its position relative to the furrow wall 64.

Referring now to FIG. 4 in which the principles of operation of applicants' invention are schematically set forth, the furrow finder includes a furrow finding member 76 pivotally mounted on the plow frame 30 and biased towards the foremost bottom 42 by means of a spring 78. The furrow finder member is interconnected with spool 80 of the three-position valve 72 by means of a push rod 81 and adjustable link 82. The fluid lines 84 and 86 are interconnected with the tractor hydraulic pump 88 and reservoir 90 by means of a three-position valve 91, which is customarily held in such a position that the output of the pump 88 is directed to line 84. The valve 72 is disposed between lines 92 and 94, which lead to the ports 96 and 98 on the cylinder 23, and lines 84 and 86. In FIG. 4, the valve 72 is shown with the spool 80 in the neutral position. If during the plowing the plow is caused to move away from the furrow wall 64, the furrow finding member will be caused to be pivoted in a counterclockwise direction about the pivot 100 moving the link 82, push rod 81 and spool 80 to the left. With the valve 91 held in its customary position, fluid will flow from the inlet port 102 on the valve 72 to the first remote port 104. The fluid under pressure will then flow through line 92 to port 96 on the rod end of the cylinder 23, thus causing fluid to be exhausted from the anchor end of the cylinder through port 98, line 94, the second remote port 106, the discharge port 108, and line 86 to the reservoir 90 on the tractor. Since the piston rod 110 of the cylinder 23 is fixed to an upstanding lug 112 on the hitch crossbar 22 by a pin 114, flow of fluid into the port 96 of the cylinder 23 will cause the cylinder 23 to shift to the right causing attendant movement of the plow frame with the cylinder. As the plow frame 30 moves towards the right, the furrow finding member 76 will be caused to rotate about the pivot 100 in a clockwise direction bringing the spool back to its neutral position.

Should the tractor propel the plow too close to the furrow wall, the furrow finding member 76 will rotate from the neutral position shown in FIG. 4 in a clockwise direction causing the spool 80 to shift within the three-position valve 72 to the right. This movement of the spool will cause fluid to flow from the inlet port 102 to the second remote port 106 back through the cylinder 23 into the first remote port 104 and the discharge port 108. Flow of fluid from the remote port 106 to the remote port 104 will cause the cylinder 23 and plow frame 30 to shift towards the left, this then causing the furrow finding member 76 to rotate in a counterclockwise direction bringing the spool 80 back to its neutral position, thereby blocking the inlet and discharge ports 102 and 108.

The automatic furrow finder 72 includes a first arm 116 pivotally interconnected with the plow frame 30, and a second arm 118 pivotally interconnected with the plow frame 30, and a second arm 118 pivotally interconnected with the first arm 116 about the fore-and-aft extending pivot 100. The inner end of the arm 116 is pivotally secured to a mounting bracket 120 by means of a pivot pin 122 which extends through an apertured lug 124 on the bracket. The mounting bracket 120 is secured to the front frame bar 34 by means of a U-bolt 126 and nuts 128. The furrow finding member 76 is carried for vertical adjustment on a support member 130. To this end, the member 76 is provided with a U-shaped end 132 which is disposed between a machine screw 134 and one side of the support member 130. By loosening the machine screw 134, the vertical position of the member 76 can be adjusted to the desired position at which time the machine screw is tightened to hold the member 76 in place. Member 76 is usually adjusted so that its bottom portion will be an inch or two above the bottom of the furrow. The support member 130 has welded thereto an inwardly extending rod 136 (FIG. 1) which is rotatably disposed within a sleeve bearing 138 carried by the second arm 118. One end of a clock spring 140 is secured to the bottom out-turned end of arm 118, the other end 142 being disposed about the upper in-turned end of the support member 130 to normally bias the support member 130 and the furrow finding member 76 in a clockwise direction when viewed from the left. To limit clockwise movement, a stop 144 is provided on the upper in-turned end of the support member 130, the stop abutting the forward end of the second arm 118.

A spring strap 146 is secured to the upper end of the second arm 118 and extends upwardly to the adjustable link 82. The link 82 is pinned to the outer end of the push rod 81 and is adjustable by means of a threaded portion 148 received within the nut 150 affixed to the barrel portion of the link 82. By properly adjusting the link 82, the desired width of cut on the font plow bottom can be maintained. The valve 72 is mounted on the first arm 116 by means of a mounting member 152 which is welded or otherwise secured to the arm 116. The inner end 154 of the mounting bracket abuts against the mounting bracket 120, and serves to limit the lower position of the furrow finding member when the plow is in its raised transport position.

The furrow finding member is of a special construction having a lower horizontally disposed portion 156 terminating in an upturned end 158. The horizontally extending portion 156 is interconnected with the vertically extending portion 160 by an intermediate portion 162 which is curved when viewed from the side (see FIG. 5) and angularly offset inwardly towards the plow as can best be seen from FIg. 6.

After one pass has been made through a field and the plow is in position to make its second pass through the field adjacent to the first one with the foremost plow body disposed adjacent the previous furrow, the plow is caused to be lowered by raising the rear wheel 50 relative to the frame 30 of the tractor and also by lowering the draft links 12. If the plow is disposed slightly to the left of the previous furrow, the furrow finding member will contact the unplowed ground. This will cause the arm 116 to swing upwardly about its pivot 122. As the plow is propelled forwardly, the furrow finding member 76 will swing rearwardly against the action of the clock spring 140 about the pivot assembly 136, 138 disposing the intermediate portion 162 of the member 76 into contact with unplowed ground. It should be noted at this point that the spring 140 is considerably weaker than the spring 78 and whenever possible the member 76 will pivot rearwardly about pivot 136, 138 rather than upwardly about pivot 122. As the plow is propelled forwardly, the portion 162 will cause the furrow finder 76 to swing outwardly until the horizontally extending portion 156 passes over the edge of the furrow wall and drops down along the furrow wall. Since the member 76 would have rotated in a counterclockwise direction about the pivot 100 during this initial movement, the spool will be shifted to the left causing the plow frame to be shifted to the right until the spool assumes its neutral position within the valve 72. In this position, the furrow finding member 76 is held in close contact with the furrow wall 64 by the action of the spring 78. Should the tractor then move away to the left from the furrow wall 64, the spool will again be shifted to the left. If the tractor and plow move to such an extent that no further movement of the spool 80 within the valve 72 is permitted, the spring strap 146 will bend to prevent damage to the other parts of the furrow finder.

In FIG. 4, a closed center valve has been schematically illustrated. It should be noted, however, that in tractors using a fixed displacement pump, it would be necessary to employ an open center three-position valve.

In certain instances, it may be desirable to land the plow independently of the automatic landing device. To provide for this, an adjustable stop 180 is secured to the stop 154 by means of a cap screw 182. In the right-hand position of stop 180, the stop 154 will contact 120; however, by positioning the stop 180 in its left-hand position, the arm 116 is raised which will permit operation of the plow without the furrow finding member 76 contacting the ground. In the raised position, the spring 78 which is secured to the arm 118 below the pivot 100, will cause the arm 118 to swing to the left, this in turn shifting the spool 80 to the right. In this position, flow from the pump 88 is directed through the valve 91 and line 84 to the left-hand side of cylinder 23. Should it then be desired to shift the plow in the other direction, namely to the right, the valve 91 is repositioned in such a manner that the output of the pump 88 is directed into line 86, this in turn causing the fluid to flow into port 108 and then to port 104 in the right-hand side of the cylinder 23. Once the desired position of the plow is located, the valve 91 is then placed in its neutral position.

In FIGS. 7 and 8, the automatic furrow finder 70 is illustrated as being mounted on a different form of semi-integral plow indicted generally at 210. The plow 210 is shown secured to the lower draft links 12 of the tractor 14. The plow 210 includes an obliquely extending truss box 21, a plurality of forwardly extending frame bars 214 and an obliquely extending truss bar 216. The rear ends of the frame bars 34 are rigidly secured to the truss bar 216. A plurality of plow bottoms indicated generally at 218 are mounted on the truss box 212. Each plow bottom or body includes a standard assembly 220 having mounted thereon a share 222 and a moldboard 224.

The forward end of the plow frame is supported by an elongated generally forwardly extending draft tube or hitch means 226. The draft tube 226 has its rear end pivotally connected between a pair of plates 228 by pivot post 230. The plates 230 are rigidly secured as by welding or the like to the top and bottom surfaces of the truss box 212 intermediate the ends thereof so that the rear portion of the draft tube 226 is in effect pivotally connected to an intermediate portion of the truss box 212. The plow 210 is secured to the rear ends of the draft links 12 of tractor 14 by a hitch crossbar 232. The crossbar 232 is rigidly connected to the lower end of a pivot shaft 234 which extends through a pivot bearing 236 rigidly mounted in the forward end of the draft tube 226.

Intermediate its ends, the draft tube 226 is slidably supported by an arcuate frame bar 238 which has one end secured to the truss box 212 by a pair of right-angle brackets 240 and its other end carried by a support member 242. The support member 242 is generally of the shape of a right-angle, has its opposite ends secured to the truss bar 216, and is provided with an upstanding bracket 244 to which the outer end of the arcuate frame bar 238 is secured. The draft tube 226 is provided with an opening intermediate its ends and a short tube 246 is mounted in the opening and slidably receives the arcuate frame bar 238. The plow frame can be pivoted about the post 230 and the arcuate frame bar 238 moved within the tube 246 by double-acting extensible and retractable hydraulic cylinder 248 which extends between and interconnects the forward end of the truss box 212 and an intermediate portion of the draft tube 226. Fluid lines 250 and 252 interconnect the opposite ends of the cylinder 248 with the ports 104 and 106 of the valve 72.

The rear end of the plow is adjustably supported on a rear furrow wheel 254 by upper and lower parallel links 256. The links 256 have their forward ends pivotally connected to a bracket on the rear end of the truss box 212 and their rear ends pivotally connected to a cast sleeve member 258. The wheel 254 is mounted on the lower end of a vertical pivot shaft 260 which extends through and is journaled in the cast sleeve member 258. The shaft 260 is interconnected with the crossbar 232 by a steering linkage which includes a first steering arm 262 secured to the upper end of the pivot post 234, a second steering arm 264 secured to the upper end of the shaft 258, an intermediate arm 266 pivotally mounted on the upper end of the pivot post 230, and front and rear rigid links 268 and 270 which extend between and interconnect the first and intermediate steering arms and the second and intermediate steering arms respectively.

It should be noted that while the hitch point of the plow 210 is so located that the tractor is driven with all wheels on the land, the connection between the crossbar 232 and pivot post 234 can be varied so that the tractor can be operated with the wheel 18 positioned in the furrow and in sliding contact with the furrow wall 64.

The automatic furrow finder 70 and valve 72 illustrated in FIGS. 7 and 8 is identical to that illustrated in FIGS. 1–5 and operates in the same manner. For example, if the plow is caused to move away from the furrow wall 64, whether it be due to changing soil conditions, hillside operation or operator error in guiding the tractor, the furrow finding member 76 will be pivoted in a counterclockwise direction about the pivot 100 and shift the spool 80 of valve 72 to the left. When the spool 80 is shifted to the left, fluid under pressure is free to flow from the pump 88 through line 84, to the valve 72 and line 250 to the anchor end of cylinder 48, thus extending the cylinder 248. When the cylinder 248 is extended, the forward portion of the plow frame is moved laterally with respect to the hitch means 226 to reposition the foremost bottom 218 by pivoting about the pivot post 230. As the frame pivots about the pivot post 230, the plow bottoms rearwardly of the pivot post 230 act against the furrow wall to prevent movement of these bottoms and cause pivotal movement of the draft tube about the pivot post 234. Since the draft tube 226 moves about the pivot post 234, only a small increment of movement is required from the cylinder 248 to land the plow the required amount. As the forward portion of the plow is brought back to its proper position with respect to the furrow wall 64, the furrow finding member 76 will be caused to rotate about the pivot 100 in a clockwise direction bringing the spool 80 back to its neutral position. Should the plow move too close to the furrow 64, the opposite sequence of events will occur and the cylinder 248 will be retracted to move the forward portion of the plow frame laterally to the left.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

We claim:

1. A landing device for a plow for use with a tractor having a source of fluid under pressure and a fluid reservoir, said plow including a frame, at least one plow body mounted on the frame, hitch means securable to the tractor, means securing the hitch means to the plow frame for lateral movement of the frame relative to the hitch means, the landing device comprising: hydraulic means operatively connected between the hitch means and frame to move the frame laterally with respect to the hitch means; a furrow finding member pivotally interconnected with the frame for swinging movement about either one or both of a fore-and-aft extending axis and a transversely extending axis; the furrow finding member having a vertically extending portion, a horizontally extending portion normally adapted to contact the wall of a previously formed furrow adjacent the foremost plow body, and a curved intermediate portion extending between the vertically extending portion and the horizontally extending portion, the intermediate portion being angled inwardly toward the plow frame; means normally biasing the furrow finding member into contact with the previously formed furrow wall; and control means interconnecting the hydraulic means with the source of fluid under pressure and the fluid reservoir in the tractor, the control means being operatively connected to and responsive to the position of the furrow finding member to cause the hydraulic means to move the frame laterally to the right or to the left whereby a desired distance between said furrow wall and the foremost plow body is maintained and, when contacting unplowed land, the furrow finding member will move outwardly from the plow when the plow is moved forwardly.

2. The landing device set forth in claim 1 in which said control means comprises a three-position control valve operable when in one position to direct fluid from the source of fluid under pressure to one side of the hydraulic means to cause the plow frame to shift relative to the hitch means in one direction, in a second position to direct fluid from the source of fluid under pressure to the other side of the hydraulic means to cause the plow frame to shift relative to the hitch means in another direction, and in a third position to prevent flow from the source of fluid under pressure to either side of the hydraulic means.

3. In combination with a semi-integral plow for use with a tractor having a source of fluid under pressure, a fluid reservoir, and vertically movable lower draft links, said semi-integral plow including a frame, vertically movable rear wheel means carried on said frame, a plurality of plow bodies mounted obliquely on said frame, a transversely extending hitch crossbar securable at its ends to the lower draft links of the tractor, and means mounting the frame on the hitch crossbar for transverse shifting movement, a landing device comprising: an extensible and retractable hydraulic cylinder secured at one end to said plow frame and at the other end to said hitch crossbar and operable upon extension and retraction to shift the plow frame transversely relative to the tractor; an arm secured to and extending generally laterally outwardly from the plow frame; furrow finder means pivotally interconnected with said arm to swing inwardly and outwardly with respect to the plow and operable when contacting unplowed ground when the plow is in its lowered position to move outwardly from the plow when the plow is moved forwardly; means normally biasing the furrow finding means inwardly toward the plow; and control means interconnecting the hydraulic cylinder with the source of fluid under pressure and the fluid reservoir on the tractor, said control means being operatively connected to and responsive to the position of the furrow finding means to cause the hydraulic cylinder to shift the frame to the right or to the left relative to the hitch crossbar whereby a desired distance between a previously formed furrow wall and the foremost plow body is maintained.

4. The combination set forth in claim 3 in which the furrow finding means is pivotally interconnected with said arm for rearward swinging movement, said furrow finding means including a member having a vertically extending portion, a horizontally extending portion normally adapted to contact the previously formed furrow wall of the furrow adjacent the foremost plow body, and a curved intermediate portion extending between the horizontally extending portion and the vertically extending portion, the intermediate portion extending inwardly toward the plow frame.

5. In combination with a semi-integral plow for use with a tractor having a source of fluid under pressure, a fluid reservoir, and vertically movable lower draft links, said semi-integral plow including a frame, vertically movable rear wheel means carried on said frame, a plurality of plow bodies mounted obliquely on said frame, a transversely extending hitch crossbar securable at its ends to the lower draft links of the tractor, and means mounting the frame on the hitch crossbar for transverse shifting movement, a landing device comprising: an extensible and retractable hydraulic cylinder secured at one end to said plow frame and at the other end to said hitch crossbar and operable upon extension and retraction to shift the plow frame transversely relative to the tractor; an arm pivotally interconnected for vertical movement with the plow frame; furrow finding means interconnected with said arm for swinging movement about a generally fore-and-aft extending axis; spring means extending between the plow frame and the furrow finding means and operable to normally bias the furrow finding means inwardly towards the plow frame; and control means interconnecting the hydraulic cylinder with the source of fluid under pressure and the fluid reservoir on the tractor, said control means being operatively connected to and responsive to the position of the furrow finding means to cause the hydraulic cylinder to shift the frame to the right or to the left relative to the hitch crossbar whereby a desired distance between a previously formed furrow wall and the foremost plow body is maintained.

6. A landing device for a plow for use with a tractor having a source of fluid under pressure and a fluid reservoir, said plow including a frame, at least one plow body mounted on the frame, hitch means securable to the tractor, means securing the hitch means to the plow frame for lateral movement of the frame relative to the hitch means, the landing device comprising: hydraulic means operatively connected between the hitch means and frame to move the frame laterally with respect to the hitch means; a mounting bracket secured to said plow frame; a first arm extending outwardly from said mounting bracket and pivotally secured to said mounting bracket for movement about a generally fore-and-aft extending axis; a furrow finding member pivotally secured to said second arm for rearward swinging movement about a generally transverse extending axis; a first spring extending between said mounting bracket and said second arm and operable to normally bias said second arm and the furrow finding member inwardly toward said plow; and second spring means mounted between the second arm and the furrow finding member operable to normally bias the furrow finding member to a forward position but operable to permit rearward swinging movement of the furrow finding member when it contacts unplowed ground; and control means interconnecting the hydraulic means with the source of fluid under pressure and the fluid reservoir on the tractor, the control means being operatively connected to and responsive to the position of the furrow finding member to cause the hydraulic means to move the frame laterally to the right or to the left whereby a desired distance between a previously formed furrow wall and the foremost plow body is maintained.

7. The combination set forth in claim 6 in which said control means is mounted on said first arm, there being a spring strap extending upwardly from the second arm and interconnected with said control means.

8. In combination with a semi-integral plow for use with a tractor having a source of fluid under pressure, a fluid reservoir, and vertically movable lower draft links, said semi-integral plow including a frame, vertically movable rear wheel means carried on said frame, a plurality of plow bodies mounted obliquely on said frame, a transversely extending hitch crossbar securable at its ends to the lower draft links of the tractor, and means mounting the frame on the hitch crossbar for transverse shifting movement, a landing device comprising: an extensible and retractable hydraulic cylinder secured at one end to said plow frame and at the other end to said hitch crossbar and operable upon extension and retraction to shift the plow frame transversely relative to the tractor; an arm pivotally interconnected with the plow frame for movement about a generally fore-and-aft extending axis; furrow finding means pivotally secured to the outer end of said arm for movement about a generally fore-and-aft extending axis; and control means interconnecting the hydraulic cylinder with the source of fluid under pressure and the fluid reservoir on the tractor, said control means being operatively connected to and responsive to the position of the furrow finding means to cause the hydraulic cylinder to shift the frame to the right or the left relative to the hitch crossbar whereby a desired distance between a previously formed furrow wall and the foremost plow body is maintained; said control means including a three-position valve having a shiftable spool therein, said three-position valve being mounted on said arm, and spring link means extending between said furrow finding means and said shiftable spool.

9. In combination with a plow for use with a tractor having a source of fluid under pressure and a fluid reservoir, the plow including a frame extending generally diagonally to the normal direction of travel of the plow, wheel means, means mounting the frame on the wheel means, a plurality of plow bodies mounted on and depending from the frame, elongated forwardly extending hitch means having its rear end pivotally connected to the frame intermediate the ends thereof, and the hitch means including means at its forward end securable to the tractor for pivotal movement of the hitch means relative to the tractor about a generally upright axis, a landing device comprising: extensible and retractable hydraulic means mounted on and extending between the frame and hitch means; a furrow finder member pivotally interconnected with the frame for swinging movement about either one or both of a fore-and-aft extending axis and a transversely extending axis; the furrow finding member having a vertically extending portion, a horizontally extending portion normally adapted to contact the wall of a previously formed furrow adjacent the foremost plow body, and a curved intermediate portion extending between the vertically extending portion and the horizontally extending portion, the intermediate portion being angled inwardly toward the plow frame; means normally biasing the furrow finding member into contact with the previously formed furrow wall; and control means interconnecting the hydraulic means with the source fluid under pressure and the fluid reservoir, the control means being interconnected with and responsive to the position of the furrow finding member to cause the hydraulic means to move the frame laterally with respect to the hitch means a desired distance between the previously formed furrow wall and the foremost plow body is maintained, and, when contacting unplowed ground, the furrow finder member will move outwardly from the plow when the plow is moved forwardly.

10. In combination with a plow for use with a tractor having a source of fluid under pressure and a fluid reservoir, the plow including a frame extending generally diagonally to the normal direction of travel of the plow, wheel means, means mounting the frame on the wheel means, a plurality of plow bodies mounted on and depending from the frame, elongated forwardly extending hitch means having its rear end pivotally connected to the frame intermediate the ends thereof, and the hitch means including means at its forward end securable to the tractor for pivotal movement of the hitch means relative to the tractor about a generally upright axis, a landing device comprising: extensible and retractable hydraulic means mounted on and extending between the frame and hitch means; an arm pivotally interconnected with the plow frame for vertical movement and normally extending generally laterally therefrom; furrow finding means pivotally interconnected with the arm for swinging movement about a generally fore-and-aft extending axis; spring means extending between the plow frame and the furrow finding means and operable to normally bias the furrow finding means inwardly toward the plow frame; and control means interconnecting the hydraulic means with the source of fluid under pressure and the fluid reservoir, the control means being interconnected with and responsive to the position of the furrow finding means to cause the hydraulic means to move the frame laterally with respect to the hitch means whereby a desired distance between a previously formed furrow wall and the foremost plow body is maintained.

11. The combination set forth in claim 10 wherein the control means includes a three-position valve mounted on said arm and having a shiftable spool therein and link means extend between and operatively interconnect the furrow finding means and the shiftable spool.

12. In combination with a plow for use with a tractor having a source of fluid under pressure and a fluid reservoir, the plow including a frame extending generally diagonally to the normal direction of travel of the plow, wheel means, means mounting the frame on the wheel means, a plurality of plow bodies mounted on and depending from the frame, elongated forwardly extending hitch means having its rear end pivotally connected to the frame intermediate the ends thereof, and the hitch means including means at its forward end securable to the tractor for pivotal movement of the hitch means relative to the tractor about a generally upright axis, a landing device comprising: extensible and retractable hydraulic means mounted on and extending between the frame and hitch means; a mounting bracket secured to said plow frame, a first arm extending outwardly from said mounting bracket and pivotally secured to said mounting bracket for movement about a generally fore-and-aft extending axis, a second arm secured to said first arm for pivotal movement about a fore-and-aft extending axis, a furrow finding member pivotally secured to said second arm for rearward swinging movement about a generally transverse extending axis, a first spring extending between said mounting bracket and said second arm and operable to normally bias said second arm and the furrow finding member inwardly toward said plow, second spring means mounted between the second arm and the furrow finding member and operable to normally bias the furrow finding member to a forward position but operable to permit rearward swinging movement of the furrow finding member when it contacts unplowed ground, and control means interconnecting the hydraulic means with the source of fluid under pressure and the fluid reservoir, the control means being interconnected with and responsive to the position of the furrow finding member to cause the hydraulic means to move the frame laterally with respect to the hitch means whereby a desired distance between the previously formed furrow wall and the foremost plow body is maintained.

13. The combination set forth in claim 12 in which said control means is mounted on said first arm, there being a spring strap extending upwardly from the second arm and interconnected with said control means.

UNITED STATES PATENT OFFICE
CERTIFICATE OF CORRECTION

Patent No. 3,603,405          Dated 7 September 1971

Inventor(s) Loren Glenn Arnold and Richard Dale Nelson

It is certified that error appears in the above-identified patent and that said Letters Patent are hereby corrected as shown below:

Column 8, line 60, after "axis;" insert -- a second arm secured to said first arm for pivotal movement about a fore-and-aft extending axis; --.

Column 9, line 64, after "source" insert -- of --; line 68, after "means" insert -- whereby --.

Signed and sealed this 21st day of March 1972.

(SEAL)
Attest:

EDWARD M. FLETCHER, JR.          ROBERT GOTTSCHALK
Attesting Officer                 Commissioner of Patents